June 3, 1969 J. I. NEVO-HACOHEN 3,447,666
CONVEYOR ELEVATOR APPARATUS
Filed Aug. 29, 1966 Sheet 1 of 3
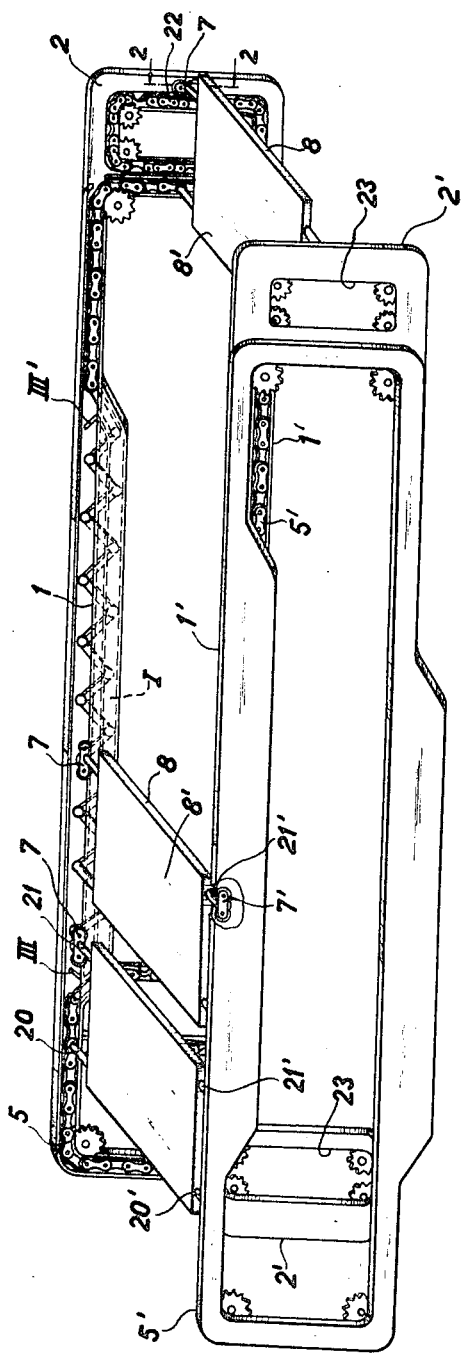
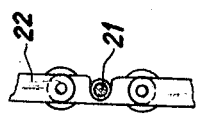
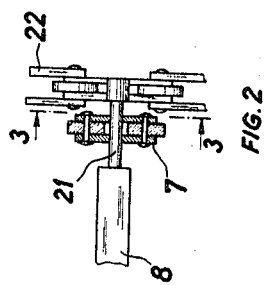
JACOB I. NEVO-HACOHEN
INVENTOR
BY Rines and Rines
ATTORNEYS

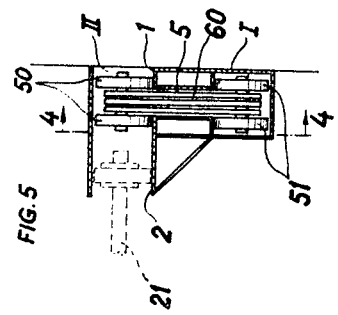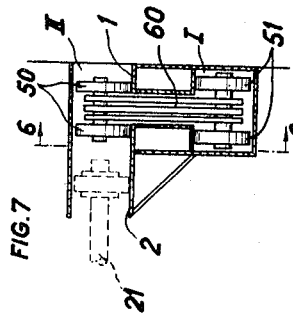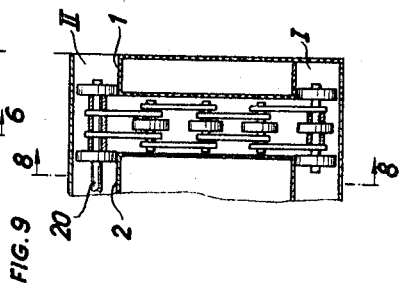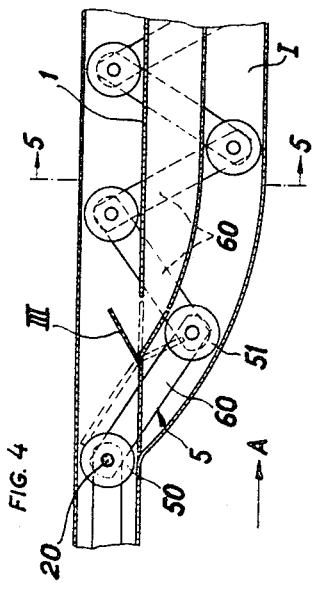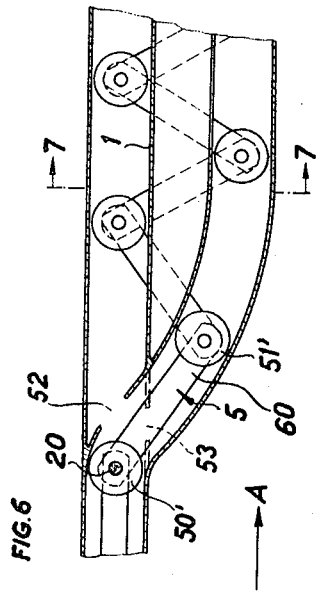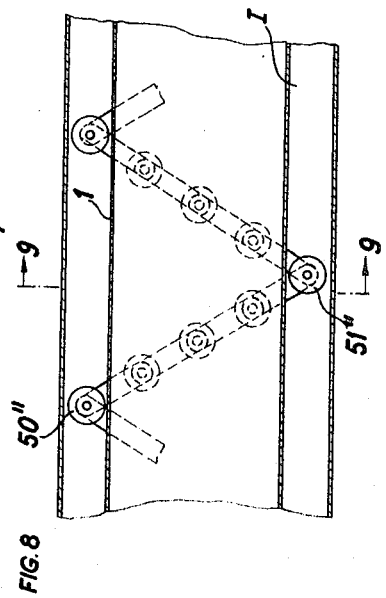

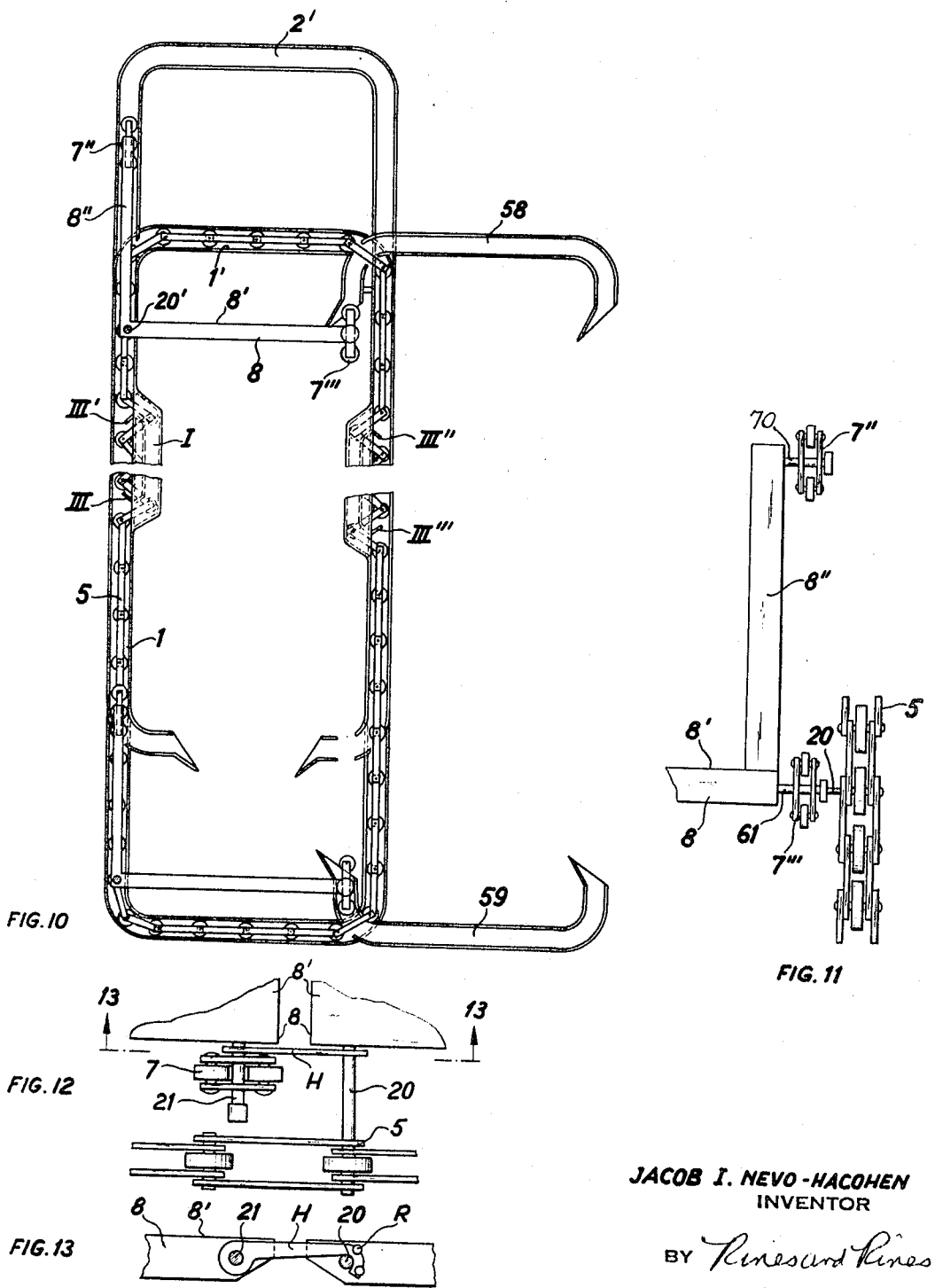

United States Patent Office 3,447,666
Patented June 3, 1969

3,447,666
CONVEYOR ELEVATOR APPARATUS
Jacob I. Nevo-Hacohen, Brookline, Mass., assignor to Computerized Volumetric Conveyance Systems, Inc., a corporation of Delaware
Filed Aug. 29, 1966, Ser. No. 575,792
Int. Cl. B65g *17/16*
U.S. Cl. 198—158      3 Claims

---

ABSTRACT OF THE DISCLOSURE

Conveyor elevator apparatus for automobile or similar articles provided with carrier platforms that are horizontally supported by means of rear and front supports, the rear supports being attached to synchronously driven main roller conveyors and the front supports traveling along auxiliary tracks parallel to the main roller conveyors, the space for housing the conveyor elevator apparatus being reduced by specific mechanism that diverts certain of the rollers of the main roller conveyors to auxiliary paths parallel to the paths of the travel of the roller conveyors.

---

The present invention relates to continuous or closed-loop conveyor elevator apparatus.

In the United States Letters Patent No. 3,197,045 of the present inventor, issued July 27, 1965, there is described a closed-loop conveyor elevator apparatus of the type herein discussed. The apparatus of said Letters Patent lends itself admirably to more conveyor applications. It has been found, however, in some applications where space is at an absolute premium (as in the holds of ships and the like) that the allowable spacing in the storage area of the apparatus is too great to be tolerated. It is, therefore, primarily to the problem of stored-article spacing that the present application is directed, and a principal object of the invention is to provide a device which allows a greater percentage of available storage space to be utilized, without losing, nevertheless, the advantages of the conveyor described in said Letters Patent.

A further object is to provide novel means to maintain horizontal orientation of the carrier platform of the conveyor during travel around the closed loop of the apparatus.

Other and further features and objects will become evident in the description to follow and will be more particularly defined in the appended claims.

In summary, however, the present invention embraces conveyor elevator apparatus having a pair of similar closed-loop main tracks disposed in spaced substantially parallel planes, and a further pair of similar closed-loop auxiliary tracks disposed in a pair of substantially parallel planes—one disposed adjacent to each of the main tracks in the space therebetween. A pair of synchronously driven main roller conveyors is disposed to travel along the pair of main tracks with follower means disposed to travel along the auxiliary tracks. A carrier platform having a substantially horizontally oriented carrying surface is disposed between the auxiliary tracks and is provided with first attaching means connecting the carrier platform to the main roller conveyors and further attaching means, at regions displaced from the first attaching means, connecting the carrier platform to the follower means. Each main track has a communicating parallel auxiliary path along a portion thereof, and means is provided for causing certain of the rollers of the said roller conveyors only to be diverted into said parallel auxiliary path during travel of the conveyors along said portion of the main track. Further preferred details are hereinafter set forth.

The invention will now be described with reference to the accompanying drawings, in which:

FIG. 1 is an isometric view of one form of the present invention showing a pair of main tracks and communicating auxiliary paths along a portion thereof;

FIG. 2 is a fragmentary view, on an enlarged scale, taken upon the line 2—2 in FIG. 1, looking in the direction of the arrows;

FIG. 3 is a view taken upon the line 3—3 in FIG. 2, looking in the direction of the arrows;

FIG. 4 is a fragmentary view showing upon an enlarged scale, the main track of FIG. 1, and a communicating auxiliary path, the figure being taken upon the line 4—4 of FIG. 5, looking in the direction of the arrows;

FIG. 5 is a view taken upon the line 5—5 in FIG. 4, looking in the direction of the arrows;

FIG. 6 is a modification of the device of FIG. 4 and is taken upon the line 6—6 in FIG. 7, looking in the direction of the arrows;

FIG. 7 is a view taken upon the line 7—7 in FIG. 6, looking in the direction of the arrows;

FIG. 8 is a modification of the device of FIG. 4, and is a view taken upon the line 8—8 in FIG. 9, looking in the direction of the arrows;

FIG. 9 is a view taken upon the line 9—9 in FIG. 8, looking in the direction of the arrows;

FIG. 10 is a plan view of a modification of the device of FIG. 1;

FIG. 11 is a fragmentary front elevational view, on an enlarged scale, of one of the L-shaped carrier platforms shown in FIG. 10;

FIG. 12 is a fragmentary plan of a modified hooking arrangement; and

FIG. 13 is a longitudinal section taken along the line 13—13 of FIG. 12.

Turning now to the drawings, it will be noted that a number of rather conventional details such as, for example, the drive mechanism, shown in the said Letters Patent, are not shown in the present drawings since they form no part of the novelty of the present invention, thereby to point out with better definition those elements that constitute the invention.

The said Letters Patent contemplates a device having a plurality of carrier platforms that travel in a closed-loop path with a fixed distance between platforms around the loop. The minimum distance between platforms is determined by movement at the ends of the loops since improper spacing may result in a collision between automobiles or other stored articles at the ends of the loops. Thus, in FIG. 1, there is a fairly sizable distance between adjacent carrier platforms in vertical movement whereas at the ends of the loops the platforms almost touch because of the geometry of the path traveled. A proposal is made to incline the channels at the ends of the loops to optimize use of the storage space. The present invention, however, optimizes the use of storage space by actually bringing the carriers in very close proximity to one another in the storage area, while leaving sufficient distance between carriers at the ends of the loops to enable changes in direction of travel. The bringing together of the carriers is effected by the provision of a divided track construction that will be discussed, together with the other elements of the invention, after a brief description of the overall operation of the conveyor.

Referring to FIG. 1, the conveyor elevator apparatus is shown having a pair of similar closed-loop main tracks or channels 1 and 1' disposed, with their associated elements, in spaced substantially parallel planes. A further pair of similar closed-loop auxiliary tracks or channels 2 and 2' is shown disposed in a pair of substantially parallel planes, one disposed adjacent to each of the main tracks in the space therebetween; the side-by-side relationship of the main and auxiliary tracks being more clearly illustrated in FIGS. 5 and 7. The driving force for the system is supplied through a pair of synchronously driven main roller conveyors or chains 5 and 5', the drive means, as before-mentioned, being omitted from the present drawings. Articles to be conveyed and stored by the present apparatus are placed upon the substantially horizontally disposed carrying surface 8' of a carrier platform 8, the carrying platform being located between the auxiliary tracks 2, 2'. To maintain the carrying surface 8' in its substantially horizontal position, the carrier platform 8 is connected through first shaft means 20 and 20' respectively to the main chains 5 and 5', and, at regions displaced from the first shaft means, through second shaft means 21 and 21' to followers 7 and 7', respectively, the followers 7 and 7' being positioned to travel along the auxiliary tracks 2 and 2', respectively.

Each main track has a communicating parallel auxiliary path (the main track 1 being shown provided with a communicating path I in FIG. 1) along a portion thereof in the storage area of the apparatus to effect a closing together of the carrier platforms by reducing the effective length of the main chains at the said portion. The main track 1 and the path I are adapted alternately to receive rollers as, for example, alternate rollers 50 and 51 in FIG. 4, 50' and 51' in FIG. 6, and 50" and 51" in FIG. 8 of the said roller chains at the said portion. Guide means is provided to cause certain of the rollers of the main chains 5 and 5' only to be diverted into the parallel auxiliary paths during travel of the main chains along the said portion of the main track.

It is now in order to discuss the said guide means, first with reference to FIGS. 4 and 5. In FIG. 5, the roller chain 5 is shown comprising spaced rollers, such as the rollers 50 and 51, connected by a plurality of links 60. As the rollers approach the divided path portion of the track 1, the rollers are caused to pass to the upper part of the main track 1 or to the auxiliary path I by a pivotable Y-shaped member III which assumes alternately the position shown in solid lines in FIG. 4 and the position shown in dotted lines. For example, as the roller 50 moves in the direction of the arrow A and contacts the upwardly inclined surface of the Y-shaped member III, the said member will pivot to the dotted position so that the roller following the roller 50 will pass along the path shown being taken by the roller 51. A pair of Y-shaped members is used at each place where the track divides, one on each side of the chain 1, and there are two such pairs associated with each division of the track (see the Y-shaped members III and III' in FIG. 1 and III, III', III" and III'" in FIG. 10). The preceding explanation assumed travel in the direction of the arrow A, but the apparatus may be reversed causing the roller 51 in FIG. 4 to leave the lower path I; again the Y-shaped member III being pivoted by action of the rollers with the timing of such pivoting controlled by appropriate spacing of the said rollers. Other means may be used to pivot the said Y-shaped members to one or the other of the two positions shown, including well-known electromechanical devices; and, further, the Y-shaped members may be replaced by gates activated by such electromechanical devices.

A further arrangement for diverting the rollers alternately to the lower and upper tracks is shown in FIGS. 6 and 7. In this instance, the upper rollers shown at 50' are the same distance apart as the rollers 50 in FIG. 5, but the lower rollers shown at 51' are a greater distance apart; the running surfaces of the main track 1 and auxiliary path I being appropriately laterally spaced to accommodate the rollers. As the rollers 51', travelling in the direction of the arrow A' in FIG. 6, approach the divided track along the appropriately widely spaced running surface of the main track 1, they are made to travel downward because the widely spaced running surface inclines downward to the communicating auxiliary path I; the rollers 50' continuing at the same level, travelling along the less widely spaced running surface of the main track 1. Openings 52 and 53 are provided in the lower and upper tracks, respectively, to enable passage therethrough of the shaft means 20 and the shaft connecting the rollers 51', respectively.

In the modification of FIGS. 8 and 9, only every fourth wheel pair rides on the running surfaces of the main track 1 and the auxiliary path I at the divided track portion. As shown, the wheel-pair 50" rides in the main track 1 and the wheel-pair shown at 51" rides in the auxiliary path I. Passage to one or the other of the running surfaces of the main track 1 and the auxiliary path I may be effected by proper gating means, as before discussed.

The divided-track arrangement just discussed thus enables the storage of a large number of carrier units in a storage area and provides, further, for rapid transmittal of the carriers to and from the storage area. Furthermore, the present apparatus has the very desirable characteristic of placing the zig-zag main chains at the divided-track portion of the apparatus in tension rather than in compression, as has been suggested in other apparatus. Chains of the type best adapted for apparatus of the type herein discussed have far greater life expectancy when operated in tension than in compression.

Auxiliary chains 22 and 23, as discussed in the said Letters Patent, engage and drive the follower means at the direction-changing ends of the loops of the main channels. To effect such engagement, the auxiliary chains, in FIG. 3, may have a recessed link which engages a shaft extension from the follower means, and, indeed, the extension may be that of the shaft means 21, as shown.

Another arrangement for effecting changes of direction of the follower, while maintaining the horizontal orientation of the carrying surface 8'. is shown in FIG. 10. The carrier platform 8 in FIG. 10 is substantially L-shaped and is connected to the main chain 5 by first shaft means 20 in FIG. 11, the previously discussed shaft means 21' at the opposite end of the carrier platform 8 not being shown. Further shaft means 70 is secured to the vertical leg 8" of the L at a region displaced from the first shaft means 61, and connects the said carrier platform to first follower means 7".

Auxiliary guide means is provided where the main conveyors and main channels change direction for maintaining the carrier platform surface 8' in substantially horizontal orientation at the direction-changing locations. The auxiliary guide means comprises further auxiliary tracks shown at 58 and 59 disposed in spaced parallel planes (only one such group of further auxiliary tracks is shown in FIG. 10); the planes of the further auxiliary tracks being located adjacent the auxiliary tracks but only at the said direction-changing locations and lying between adjacent main or auxiliary tracks or between the auxiliary tracks.

Second follower means 7'" is secured by second shaft means 61, FIG. 11, to the horizontal leg 8 of the L at a region displaced from the first attaching means 20. The first follower means 7" is adapted to ride in the auxiliary channel 2 and the second follower means 7'" is adapted to ride in the further auxiliary tracks 58 and 59, thereby to maintain the said horizontal orientation of the said direction-changing ends of the loops. Also, the auxiliary track 2 may be discontinuous, if desired, as shown at the lower portion thereof in FIG. 10.

Since, in some cases, the horizontal track is quite long, and consequently causes the accumulation of friction resistance, a pivotable hook H is provided to relieve the tension of the chain 5 at the horizontal track section. As the platform 8 comes to the horizontal track section and the chain rollers 50, 51, etc. follow the corresponding track 1 and auxiliary path I forming the V-shaped configuration shown in FIG. 1, the follower guides the hook H downwards to hook upon the journalling shaft 20 of the main chain 5. The distance between the main track 1 and its communicating parallel auxiliary path I, is made somewhat smaller, the hook H will carry the tension load between the platforms 8, and the chain 5 is relieved. The hook H may be provided with guide rollers R to accept the guiding in the follower track into temporary hooked and disengaged positions.

Further modifications of the invention will occur to those skilled in the art and all such modifications are deemed to be within the scope of the present invention as defined in the appended claims.

What is claimed is:

1. Conveyor elevator apparatus having, in combination, a pair of similar closed-loop main tracks disposed in spaced substantially parallel planes, a pair of similar closed-loop auxiliary tracks disposed in a pair of substantially parallel planes adjacent to each of the main tracks, respectively, in the space therebetween, a pair of synchronously driven main roller conveyors disposed to travel along said pair of main tracks, follower means disposed to travel along the auxiliary tracks, a carrier platform having a substantially horizontal carrying surface disposed between the auxiliary tracks, first attaching means adjacent to one end of said carrier platform connecting the carrier platform to the main roller conveyors, second attaching means adjacent to the opposite end of said carrier platform connecting the carrier platform to the follower means, each main track having a communicating parallel auxiliary path along a portion thereof, means for causing certain of the rollers of said roller conveyors to be diverted into said parallel auxiliary paths during travel of other rollers of the conveyors along the said portions of the main tracks, each of said roller conveyors comprising a plurality of sequential roller pairs, with the rollers of each pair being disposed in parallel planes, the rollers of alternate roller pairs being spaced a predetermined distance apart and the rollers of the intervening pairs being spaced a different distance apart, said diverting means comprising track elements engaging only the rollers spaced said different distance apart for guiding them to said auxiliary paths.

2. Conveyor elevator apparatus in accordance with claim 1 and further comprising auxiliary conveyor means of effective length substantially less than the length of the main conveyors, located adjacent to the said main conveyors only where the main conveyors and main tracks change direction, for engaging and driving the follower means only at such locations, whereby said carrying surface is maintained in substantially the same horizontal orientation throughout its travel.

3. The apparatus of claim 2 and in which the auxiliary conveyor means is a link roller chain with the links connecting adjacent rollers having indents to receive the said second attaching means, thereby to engage and guide said follower means at said locations.

References Cited

UNITED STATES PATENTS

| | | | |
|---|---|---|---|
| 235,128 | 12/1880 | Cook | 198—174 |
| 2,052,513 | 8/1936 | Kimball | 193—31 |
| 3,031,066 | 4/1962 | Leach | 198—140 |
| 3,166,180 | 1/1965 | Sonderegger | 198—158 |
| 3,172,527 | 3/1965 | Swartz | 198/158 |
| 2,965,049 | 12/1960 | Royer | 198—138 |
| 3,062,358 | 11/1962 | Woodward | 198—154 |

FOREIGN PATENTS 653,434   5/1951   Great Britain.

RICHARD E. AEGERTER, *Primary Examiner.*